United States Patent [19]
Geen

[11] Patent Number: 5,635,638
[45] Date of Patent: Jun. 3, 1997

[54] COUPLING FOR MULTIPLE MASSES IN A MICROMACHINED DEVICE

[75] Inventor: John A. Geen, Tewksbury, Mass.

[73] Assignee: Analog Devices, Inc., Norwood, Mass.

[21] Appl. No.: 469,896

[22] Filed: Jun. 6, 1995

[51] Int. Cl.[6] .................................................. G01P 9/04
[52] U.S. Cl. ................................ 73/504.04; 73/504.12; 73/514.32
[58] Field of Search .................... 73/504.04, 504.42, 73/504.03, 514.29, 514.37, 514.38, 514.32, 862.59

[56] References Cited

U.S. PATENT DOCUMENTS

| | | | |
|---|---|---|---|
| 4,782,700 | 11/1988 | Hulsing | 73/504.12 |
| 4,811,602 | 3/1989 | Hulsing | 73/504.04 |
| 4,821,572 | 4/1989 | Hulsing, II | 73/504.04 |
| 4,848,156 | 7/1989 | Hulsing | 73/504.04 |
| 4,864,861 | 9/1989 | Hulsing | 73/504.12 |
| 5,168,756 | 12/1992 | Hulsing, II | 73/504.02 |
| 5,203,208 | 4/1993 | Bernstein | 73/504.12 |
| 5,241,861 | 9/1993 | Hulsing, II | 73/504.04 |
| 5,275,048 | 1/1994 | Hulsing, II et al. | 73/514.01 |
| 5,331,853 | 7/1994 | Hulsing, II | 73/514.37 |
| 5,341,682 | 8/1994 | Hulsing, II | 73/504.04 |
| 5,349,855 | 9/1994 | Bernstein et al. | 73/504.16 |
| 5,392,650 | 2/1995 | O'Brien et al. | 73/514.18 |
| 5,396,797 | 3/1995 | Hulsing, II | 73/504.04 |

OTHER PUBLICATIONS

Geen, "Inertial Sensor Micromachining at Northrop", Institute of Navigation 061 (1993).

Hunt, et al. "Development of an Accurate Tuning-Fork Gyroscope" Proc. Inst. Mech. Engrs., v. 179, pt. 3B, 1964–65.

Hulsing, II, et al. "Miniature IMU Based on Micro-machined Coriolis Sensors", Institute of Navigation (1993).

Primary Examiner—Christine K. Oda
Attorney, Agent, or Firm—Hale & Dorr

[57] ABSTRACT

A micromachined device has two suspended masses positioned near each other, each of the masses being dithered along a dither axis. Two couplings, each including an arcuate member and an anchored support beam, are provided between the masses to allow relative anti-phase movement and to resist relative in-phase movement. The coupling extends around a region intermediate the masses where a dither detection device is disposed.

26 Claims, 3 Drawing Sheets ents less expensively than bulk micromachining and that allows greater flexibility in the shapes of components. Other features and advantages will become apparent from the following detailed description when read in conjunction with the drawings, and from the appended claims.

COUPLING FOR MULTIPLE MASSES IN A MICROMACHINED DEVICE

FIELD OF THE INVENTION

This invention relates to a micromachined device.

BACKGROUND OF THE INVENTION

In one type of micromachined device for sensing inertial motion about an angular rate axis, a suspended mass is dithered (oscillated) with a certain amplitude and frequency along a dither axis. The dither axis is orthogonal to an axis that is sensitive to acceleration, and also to the rate axis. The rotation of the suspended mass about the rate axis and its velocity along the dither axis produce a Coriolis acceleration along the sensitive axis. This acceleration is twice the cross product of the dithering velocity and the rate of rotation. The device measures this Coriolis acceleration and any linear acceleration along the sensitive axis.

In a device disclosed in U.S. Pat. No. 5,241,861 (which has a background section describing the general principles of operation of such a device), two accelerometers are disposed side-by-side and are each suspended from a frame by a pair of flexures. By using two accelerometers that are dithered in an equal and opposite manner, the linear acceleration components and rotational acceleration components can be determined by sum and difference techniques. The two accelerometers are connected with a single link that extends from a corner of one accelerometer and across a region between the accelerometers to a corner of the other accelerometer diagonally across the region. As recited in that patent, the link has a pivoting point to permit the link to pivot such that when one of the accelerometers is moved, an equal and opposite motion is imparted to the other accelerometer. The device in that patent is bulk micromachined. Such a process is expensive and the anisotropic etching that is required for precision limits the form of the linkage.

SUMMARY OF THE INVENTION

The present invention relates to a micromachined device having first and second movable masses formed in a substrate. Each of the first and second masses is vibrated along a dither axis, preferably with drive combs, with sinusoidal velocities having equal amplitudes and frequencies. The masses dither 180° out of phase. A coupling helps to maintain the desired relationship between the velocities and phases of the masses.

According to an embodiment of the present invention, the coupling extends between the two masses and includes an arcuate beam extending from the first mass to the second, preferably extending from an inside corner of the first mass to a corresponding inside corner of the second mass along a curved path. The arcuate beam is tangentially connected to a support beam, which is disposed substantially parallel to the dither axis and anchored at its ends to the substrate. In preferred embodiments, two arcuate beams are provided, each extending around a region intermediate the first and second masses. The midpoint of the arcuate beam is coupled to the midpoint of a respective support beam.

Since the support beams are anchored at their ends, when the two masses move in an anti-phase manner, i.e., in opposite directions along the dither axis, the arcuate members cause the support beams to bend with minimal resistance at their midpoints toward and away from the masses along the rate axis. If the masses try to move in an in-phase manner, however, the couplings are urged to move along the dither axis. Because the support beams are anchored at their ends, however, they substantially resist such movement. This resistance helps bring the masses back to the minimally resistant anti-phase movement.

The coupling thus allows relative anti-phase movement and resists relative in-phase movement, and accomplishes this with a structure that is easy to manufacture. Because the couplings preferably extend around a region between the masses, a transduction device, such as a dither detection device or a driver can be provided in the region between the masses. This accelerometer is preferably produced by surface micromachining, a process that produces smaller components less expensively than bulk micromachining and that allows greater flexibility in the shapes of components. Other features and advantages will become apparent from the following detailed description when read in conjunction with the drawings, and from the appended claims.

DETAILED DESCRIPTION

Figure 1:
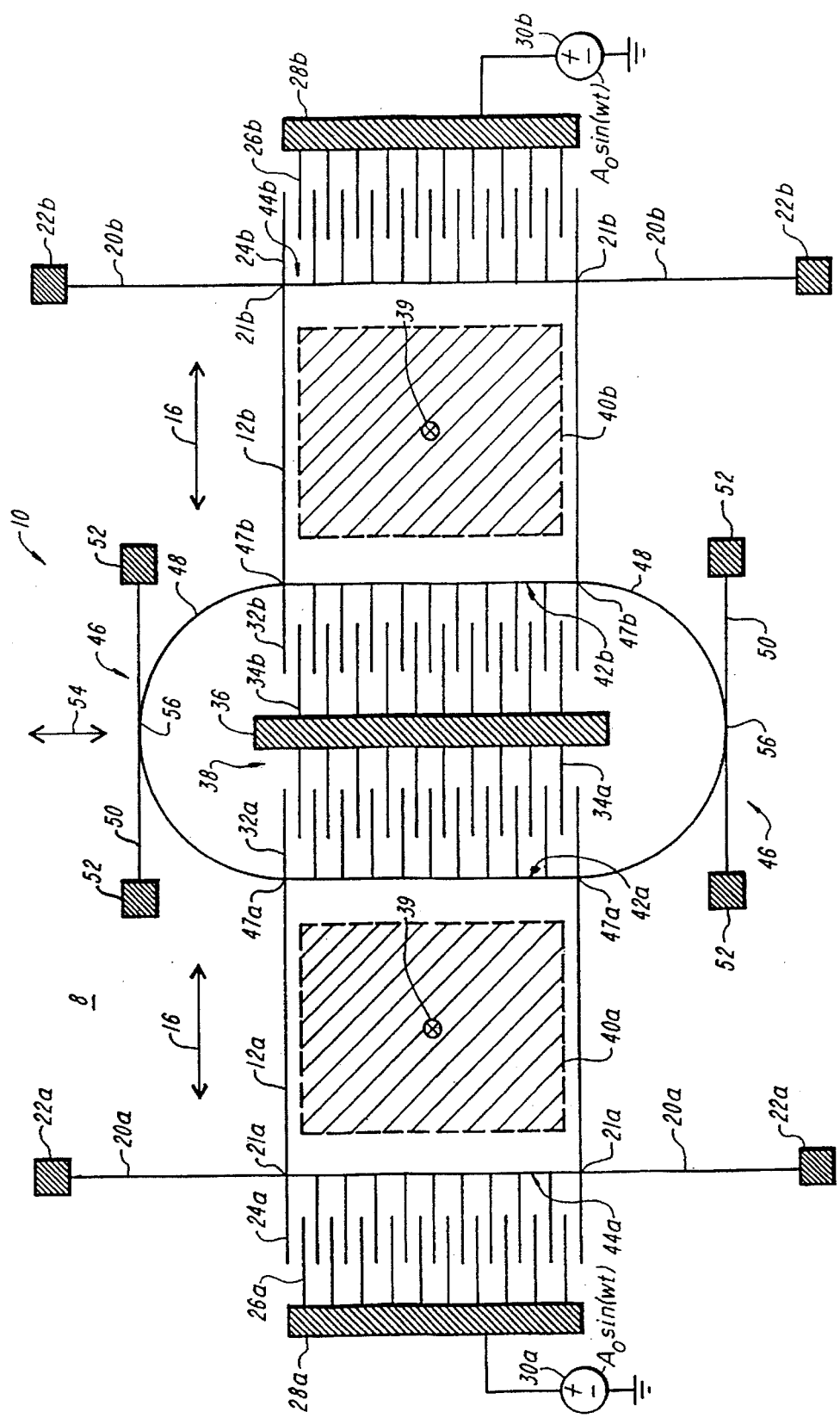
FIG. 1 is a plan view of a device according to the present invention.

Referring to FIG. 1, a micromachined device 10 has two generally rectangular polysilicon masses 12a, 12b, each of which has an inner end 42a, 42b facing the other mass, and a parallel, opposite outer end 44a, 44b facing away from the other mass. Each mass 12a, 12b is suspended over a background silicon substrate (represented by 8) with a pair of anchored tether beams 20a, 20b. Each tether beam in a pair extends from a different corner 21a, 21b at the outer end of one of the masses and along a rate axis 54. The tether beams are anchored with anchors 22a, 22b that extend to the substrate along a sensitive axis 39 that is perpendicular to the rate axis.

Each mass has fingers 24a, 24b that extend away from the outer end of the respective mass. Respective drive combs 28a, 28b, have fingers 26a, 26b that extend toward and interdigitate with, respective fingers 24a, 24b. Combs 28a, 28b, which are driven by respective voltage supplies 30a, 30b, cause the masses to dither along a dither axis 16 (which is mutually orthogonal to rate axis 54 and sensitive axis 39). Drive combs 28a, 28b drive the masses linearly with equal and opposite sinusoidal voltages, resulting in velocities of Vsin(wt) and −Vsin(wt).

Since the masses have equal mass and move in an equal and opposite manner, momentum (the product of mass and velocity) is conserved locally between the masses relative to the substrate and the supporting frame. The equal and opposite dithering velocities also cause the components of the acceleration along the sensitive axis resulting from rotation of the device about the rate axis to be equal and opposite for the two masses. Linear acceleration of the device along the sensitive axis, by contrast, causes the masses to accelerate equally and in-phase.

Acceleration along the sensitive axis is sensed using Coriolis pickoff electrodes 40a, 40b, which are conductive plates disposed on the substrate and under respective suspended masses 12a, 12b. These electrodes can be formed from polysilicon, inert metal, or a diffusion layer in the substrate, and are used to sense capacitance between respective masses 12a, 12b and electrodes 40a, 40b. From this capacitance, an acceleration of each mass is determined. The sensed accelerations are a sum of the linear acceleration and of the rotational Coriolis acceleration and can be represented as A+asin(wt) and A−asin(wt), where A is the linear component and asin(wt) is the rotational component ("a" being a constant and w being the angular frequency of the dither).

Consequently, by adding the accelerations, the rotational components cancel out; similarly, by subtracting, the linear acceleration components cancel out. In the latter case, the rotational components can be used, for example, to detect the yaw of a vehicle in a system for automatically controlling skidding.

In-phase movement, in which both masses move in the same direction along the dither axis, adversely affects such measurement. First, such movement creates local momentum relative to the frame and the substrate. Second, without anti-phase movement, adding and subtracting the accelerations will not cancel out undesired components.

In a region 38 defined between the masses, a pickoff comb 36 is provided. Comb 36 senses the velocities of the masses to help keep the desired anti-phase relationship. The pickoff comb extends along axis 54 and has fingers 34a, 34b that extend along dither axis 16 toward the respective masses 12a, 12b. At the inner end of each mass and extending toward the other mass are fingers 32a, 32b, which interdigitate with respective fingers 34a, 34b. Pickoff comb 36 is used to sense changes in capacitance between fingers 32a, 32b and fingers 34a, 34b, and thus to detect the dithering velocity of the masses. The pickoff comb provides a signal based on this velocity as an output and also as a feedback signal to the drive combs. The feedback signal is used to help maintain the desired drive signals to the masses. By detecting the velocities, the comb also measures one of the two factors that contributes to the Coriolis acceleration, which allows the other factor (the rotation rate) to be calculated.

The equal and opposite relationship between the masses is also ensured by two substantially identical mechanical couplings 46 which tightly couple together masses 12a, 12b to help keep the frequencies the same, to allow relative anti-phase movement, and to substantially resist relative in-phase movement.

Each coupling 46 has an arcuate member 48 that extends from a corner 47a at inner end 42a of mass 12a to a corresponding corner 47b at inner end 42b of mass 12b. Each arcuate member extends from one mass to the other along a curved path that preferably extends around region 38, and thus around dither pickoff comb 36. Each arcuate member is coupled to a respective support beam 50 at a tangent point 56, which is preferably the midpoint of arcuate member 48 and also the midpoint of support beam 50. Each support beam extends substantially along dither axis 16 and is coupled to the substrate with anchors 52. The support beams are preferably longer than the distance between masses 12a, 12b.

Figure 2:
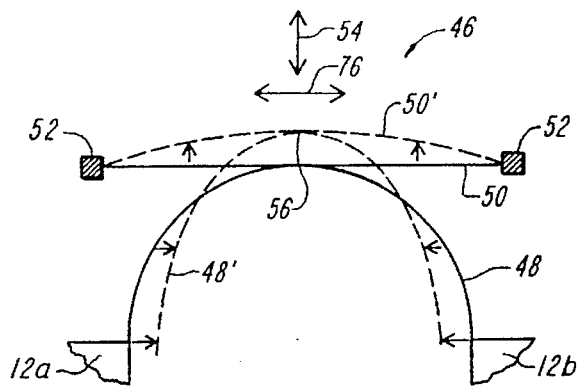
FIGS. 2 and 3 are plan views of a coupling arrangement of the present invention, shown with anti-phase and in-phase movement, respectively.

Referring to FIG. 2, when masses 12a, 12b move in an anti-phase manner, i.e., when one moves one way along axis 16 while the other moves in the opposite direction, the ends of arcuate member 48 are drawn slightly inward or outward. Since the support beam 50 is anchored along the direction of dither axis 16, the support beam bends at its midpoint and moves along rate axis 54. Member 48 and beam 50 thus move to positions 48' and 50', respectively, when the masses move toward each other. Coupling 46 thus allows this bending in the support beam with minimal resistance during anti-phase movement.

Figure 3:
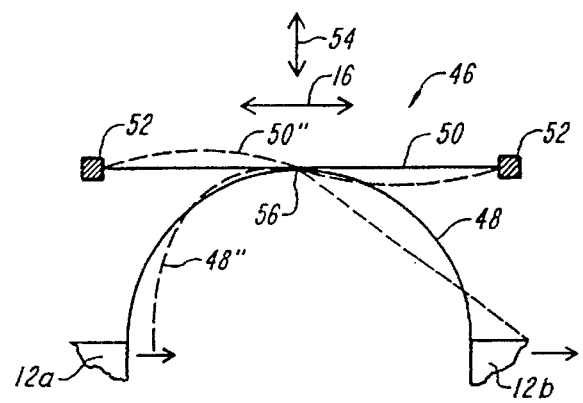

Referring to FIG. 3, if the masses try to move in an in-phase manner, i.e., when each mass is moving in the same direction along dither axis 16, masses 12a, 12b try to move arcuate member 48 and hence support beam 50 along axis 16 (rather than perpendicular to it as in FIG. 2). Anchors 52, however, cause the support beam to substantially resist such movement along axis 16. Such movement urges arcuate member 48 and support beam 50 into an awkward configuration as shown by positions 48" and 50", which substantially resists this movement. The couplings thus cause the masses to move in the much less resistant anti-phase manner. The tight coupling also forces the masses to move with equal frequency.

Figure 4:
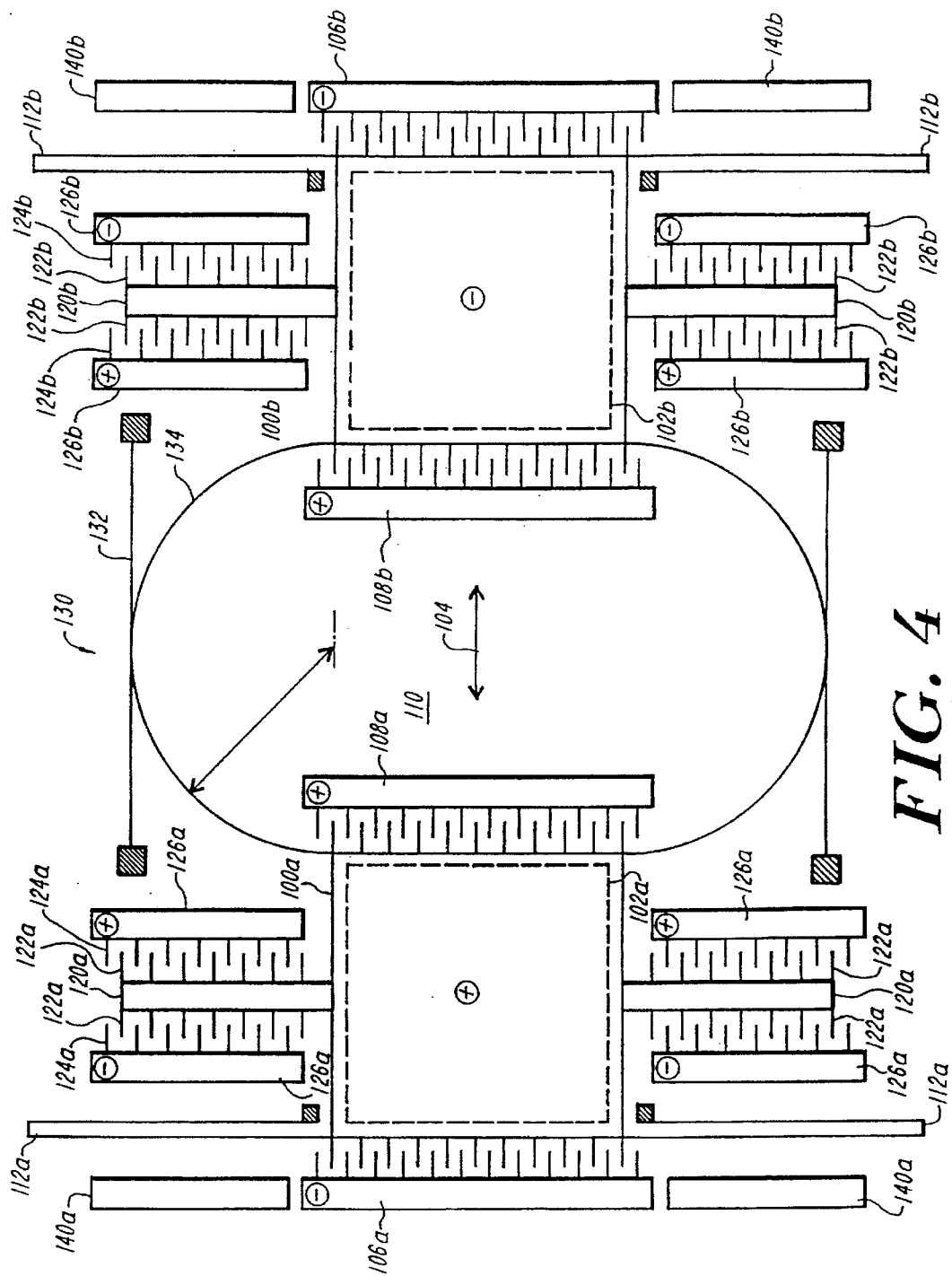

Referring to FIG. 4, in another embodiment of the present invention, masses 100a, 100b are suspended over a background substrate and are dithered along a dither axis 104 over electrodes 102a, 102b. In a preferred embodiment, the masses and electrodes are each square and have a side of 200 microns and 180 microns, respectively. Masses 100a, 100b are driven by two sets of combs, 106a, 106b which interdigitate with fingers extending from each mass away from the opposite mass, and combs 108a, 108b which have fingers which interdigitate with fingers extending toward the opposite mass. Accordingly, combs 108a, 108b are in a region 110 between the two masses.

Masses 100a, 100b have lateral beams 120a, 120b that extend from a midpoint along the dither axis in a direction perpendicular to dither axis 104. Members 120a, 120b each have fingers 122a, 122b which extend parallel to dither axis 104 in both directions from members 120a, 120b. Fingers 122a, 122b interdigitate with fingers 124a, 124b of pickoff combs 126a, 126b.

Figure 5:
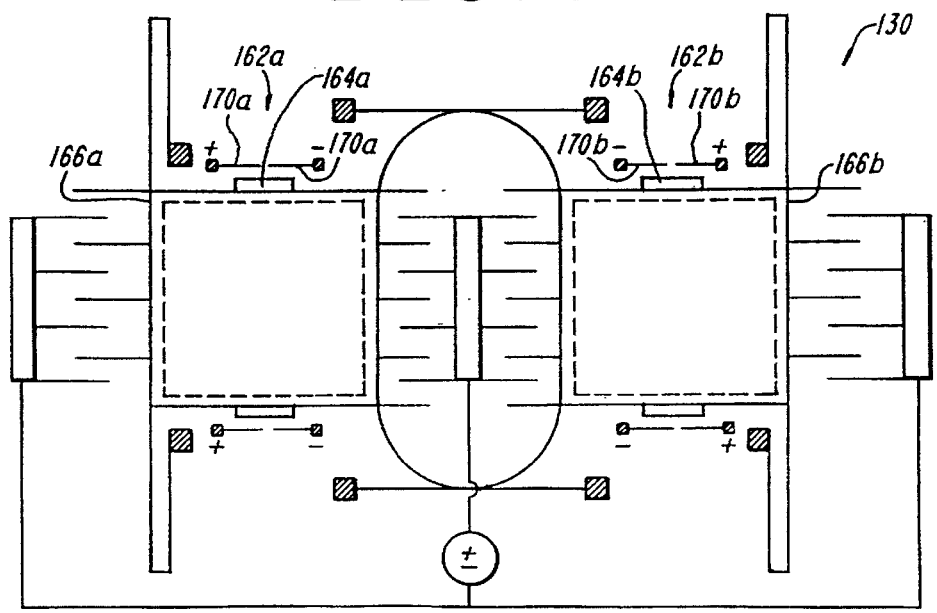
FIGS. 4 and 5 are plans views of a device according to other embodiments of the present invention.

In the embodiments of FIGS. 4 and 5, couplings 130 are similar to those shown in FIG. 1 in that they each include a support beam extending parallel to dither axis 104, and an arcuate beam 134 extending from a corner of each of masses 100a, 100b and contacting the midpoint of support beam 132 at the midpoint of arcuate beam 134. The arcuate beam is preferably semicircular and has a radius of 140 microns, while the support beam has a total length of about 280 microns.

Referring to FIG. 5, in another embodiment of the present invention, device 160 is generally similar to that of FIG. 4 in that each mass has a pair of drive combs, one on each of two opposite sides of each mass. In device 160, the dither pickoff devices 162a, 162b are different from those in the embodiment of FIG. 4. Each pickoff device 162a, 162b includes a short tab 164a, 164b that extends away from sides of masses 166a, 166b. The movement of these tabs is sensed by two anchored fingers 170a, 170b. Fingers 170a, 170b form a differential capacitor with respective tabs 164a, 164b. Dither pickoff devices 162a, 162b can be formed with less fabrication and in a smaller space than the dither pickoff devices in the embodiments of FIGS. 1 and 4.

In the embodiments of FIGS. 4 and 5, rather than providing a dither pickoff device between the masses, drive combs are between the masses, in addition to those at outer ends. By providing additional fingers and/or tabs for performing the pickoff function at the sides of the proof masses unwanted electrostatic forces parallel to sensitive axis 39 are better balanced.

In the embodiments of FIGS. 4 and 5, tethers 112a, 112b, which anchor mass 100a, 100b to the substrate are folded to balance the compliance of the beams with that of the arcuate and support beams that form the coupling. In the device of FIG. 4, beam etch equalizer areas 140a, 140 are provided as dummy regions which allow folded tethers 112a, 112b to be etched evenly. Otherwise, one of the two legs of the folded tether could be overetched.

According to the present invention, a simple coupling structure between two masses allows anti-phase movement and substantially resists in-phase movement. This coupling thus helps conserve momentum locally and improve measurement by allowing components to be additively cancelled. In addition, transduction devices, such as dither detection devices or dither drivers, can be provided in the region between the masses.

Having described an embodiment of the present invention, it should be apparent that other modifications can be made without departing from the scope of the invention as defined by the appended claims. For example, while dither pickoff comb 36 is shown as having a single member extending along axis 54 with fingers extending toward each of the masses, a pair of separate parallel members extending along axis 54 can be provided. The coupling could extend in a concave manner between the masses, although it would then be more difficult to provide the dither detection between the masses, and the length of the support beam would be limited to the distances between the masses. The coupling has been described with an arcuate member, but the coupling could include a straight beam extending from each mass to the support beam.

What is claimed is:

1. A micromachined device comprising:

a substrate;

a first movable mass anchored to the substrate;

a second movable mass anchored to the substrate, the first and second masses each being movable along a dither axis, the first and second masses defining an intermediate region therebetween; and a first coupling extending from the first mass to the second mass, the coupling allowing relative anti-phase movement and resisting relative in-phase movement by the masses, the first coupling including:

a first arcuate member extending along a first path from the first mass to the second mass, the first path extending around and not through the intermediate region.

2. The device of claim 1, further including a transduction device disposed in the intermediate region, the arcuate member extending around the device.

3. The device of claim 2, wherein the transduction device includes a comb having a series of fingers extending toward the first mass, the first mass having a series of fingers that interdigitate with the fingers of the comb.

4. The device of claim 1, further comprising a second arcuate member extending along a second path from the first mass to the second mass, the second path also extending around and not through the intermediate region.

5. The device of claim 4, wherein each of the first and second arcuate members extends from a different corner of the first mass to a corresponding corner of the second mass.

6. The device of claim 5, further comprising first and second support beams, wherein each arcuate member is coupled to a respective support beam, each support beam extending substantially along the dither axis and being anchored to the substrate.

7. The device of claim 6, wherein each support beam is anchored at its ends and is coupled to the respective arcuate member at a midpoint of the support beam such that the support beam bends along an axis perpendicular to the dither axis during relative anti-phase movement by the first and second masses.

8. The device of claim 1, wherein the arcuate member extends from a corner of the first mass to a corresponding corner of the second mass.

9. The device of claim 1, further including electrodes formed on the substrate under the masses, the electrodes for sensing capacitance relative to the masses, the capacitance being used to sense acceleration.

10. A micromachined device comprising:

a substrate;

a first movable mass anchored to the substrate;

a second movable mass anchored to the substrate;

means for dithering the first and second masses along a dither axis; and a coupling extending from the first mass to the second mass, the coupling allowing anti-phase movement and resisting in-phase movement of the masses, the coupling including:

a suspended support beam extending along the dither axis and being anchored to the substrate so that the support beam is substantially immobile along the dither axis, the support beam bending along a direction substantially transverse to the dither axis; and a coupling member extending from each of the masses to the support beam.

11. The device of claim 10, wherein the coupling member extends around a region intermediate the first and second masses.

12. The device of claim 11, further comprising a transduction device in the region.

13. The device of claim 10, wherein the coupling member includes an integral arcuate member.

14. The device of claim 10, further including electrodes formed on the substrate under the masses, the electrodes for sensing capacitance relative to the masses, the capacitance being used to sense acceleration.

15. A micromachined device comprising:

a substrate;

a first movable mass anchored to the substrate;

a second movable mass anchored to the substrate, the first and second masses defining an intermediate region therebetween;

means for dithering the first and second masses along a dither axis;

a transduction device anchored to and suspended over the substrate and disposed in the intermediate region between the masses for sensing movement of the first and second masses; and a coupling extending from the first mass to the second mass, the coupling allowing relative anti-phase movement of the masses and resisting relative in-phase movement of the masses.

16. The device of claim 15, wherein the transduction device is a comb having a series of fingers extending toward the first mass, the first mass having a series of fingers that interdigitate with the fingers of the comb.

17. The device of claim 15, wherein the coupling includes an arcuate member extending along a path from an end of the first mass to an end of the second mass, the path extending around and not through the intermediate region.

18. The device of claim 17, further comprising a support beam coupled to the arcuate member and extending in a direction parallel to the dither axis.

19. The device of claim 18, wherein the support beam is anchored at its ends and couples the arcuate member at a midpoint of the support beam such that the support beam is bendable along an axis substantially perpendicular to the dither axis during relative anti-phase movement by the first and second masses.

20. The device of claim 17, further comprising a second coupling including a second arcuate member extending from the end of the first mass to the end of the second mass.

21. The device of claim 20, wherein the second coupling further includes a second support beam coupled to the second arcuate member and extending in a direction substantially parallel to the dither axis.

22. The device of claim 15, further including electrodes formed on the substrate under the masses, the electrodes for sensing capacitance relative to the masses, the capacitance being used to sense acceleration.

23. A micromachined device comprising:

a substrate;

a first movable mass anchored to the substrate;

a second movable mass anchored to the substrate;

the first and second masses defining an intermediate region therebetween, each of the first and second masses having a first end facing the other mass and a second end facing away from the other mass;

first means, at the first end of each of the first and second masses, for dithering the first and second masses along a dither axis; and second means, at the second end of each of the first and second masses, for dithering the first and second masses along the dither axis.

24. The device of claim 23, wherein at least one of the first and second dithering means includes a comb with fingers.

25. A micromachined device of claim 23, wherein each mass has pickoff means for sensing the dithering motion.

26. The device of claim 25, wherein the pickoff means includes at least one member extending away from the masses in a direction perpendicular to the dither axis.

* * * * *